US010407306B2

(12) United States Patent
Ishikawa et al.

(10) Patent No.: US 10,407,306 B2
(45) Date of Patent: Sep. 10, 2019

(54) METHOD OF PRODUCING FLUOROAPATITE POWDER, FLUOROAPATITE POWDER, AND ADSORPTION APPARATUS

(75) Inventors: Tsuyoshi Ishikawa, Tochigi (JP); Yoshiyuki Ogawara, Tochigi (JP); Tomohiko Yoshitake, Tokyo (JP); Yukiko Murakami, Saitama (JP)

(73) Assignee: HOYA CORPORATION, Tokyo (JP)

( * ) Notice: Subject to any disclaimer, the term of this patent is extended or adjusted under 35 U.S.C. 154(b) by 1762 days.

(21) Appl. No.: 12/568,753

(22) Filed: Sep. 29, 2009

(65) Prior Publication Data

US 2010/0255306 A1 Oct. 7, 2010

(30) Foreign Application Priority Data

Sep. 30, 2008 (JP) .................................. 2008-254836

(51) Int. Cl.
*B01J 2/00* (2006.01)
*C01B 25/32* (2006.01)
*B01J 20/04* (2006.01)
*B01J 20/28* (2006.01)
*B01J 20/282* (2006.01)

(52) U.S. Cl.
CPC .............. *C01B 25/32* (2013.01); *B01J 20/048* (2013.01); *B01J 20/282* (2013.01); *B01J 20/28004* (2013.01); *B01J 20/28011* (2013.01); *B01J 2220/52* (2013.01); *B01J 2220/56* (2013.01); *Y10T 428/2982* (2015.01)

(58) Field of Classification Search
USPC ............................. 264/13, 234, 442; 366/127
See application file for complete search history.

(56) References Cited

U.S. PATENT DOCUMENTS

| | | | | |
|---|---|---|---|---|
| 4,157,378 A * | 6/1979 | Tomlinson et al. | ............ | 423/301 |
| 4,893,320 A * | 1/1990 | Yanagi et al. | .................. | 377/11 |
| 5,690,908 A * | 11/1997 | Deutsch et al. | ............. | 424/9.32 |
| 6,306,297 B1 * | 10/2001 | Ichitsuka et al. | .......... | 210/198.2 |
| 7,150,862 B2 | 12/2006 | Ishikawa et al. | | |
| 2006/0052479 A1* | 3/2006 | Cougoulic | ..................... | 523/113 |
| 2009/0060814 A1* | 3/2009 | Ishikawa et al. | ............. | 423/301 |
| 2009/0087369 A1* | 4/2009 | Ishikawa et al. | ............. | 423/311 |
| 2009/0148376 A1* | 6/2009 | Ishikawa et al. | ............. | 423/301 |
| 2009/0215997 A1* | 8/2009 | Sugo et al. | .................... | 530/415 |
| 2010/0130353 A1* | 5/2010 | Ishikawa et al. | ............. | 502/400 |
| 2010/0255306 A1* | 10/2010 | Ishikawa et al. | ............. | 428/402 |

FOREIGN PATENT DOCUMENTS

| | | | |
|---|---|---|---|
| JP | 2003-200039 A | | 7/2003 |
| JP | 2004-330113 A | | 11/2004 |
| JP | 2004330113 A | * | 11/2004 |

\* cited by examiner

*Primary Examiner* — Ryan M Ochylski
(74) *Attorney, Agent, or Firm* — Greenblum & Bernstein, P.L.C.

(57) ABSTRACT

A method of producing fluoroapatite powder by using a calcium compound, a phosphate compound, and a fluorine compound as a raw material is provided. The method comprises: preparing a slurry containing fluoroapatite produced from the raw material by using a wet process; applying an ultrasonic wave to the slurry; and drying the slurry to obtain the fluoroapatite powder mainly constituted of the fluoroapatite. The method provides fluoroapatite powder having improved particle strength. Further, an adsorption apparatus including the fluoroapatite powder is also provided.

15 Claims, 1 Drawing Sheet

METHOD OF PRODUCING FLUOROAPATITE POWDER, FLUOROAPATITE POWDER, AND ADSORPTION APPARATUS

FIELD OF THE INVENTION

The present invention relates to a method of producing fluoroapatite powder, fluoroapatite powder, and an adsorption apparatus, and in particular relates to a method of producing fluoroapatite powder, fluoroapatite powder obtained by the method, and an adsorption apparatus that uses the fluoroapatite powder.

BACKGROUND ART

Hydroxyapatite has a chemical structure in which calcium ions and phosphate groups are regularly arranged in a high density state. Such hydroxyapatite serves as an amphoteric ion exchange body and has adsorption capability due to electrostatic interaction by the amphoteric ion exchange body.

Therefore, powder (hydroxyapatite powder) constituted of this hydroxyapatite is widely used as an adsorbent which is used for a column of separating biologically-relevant materials such as proteins, nucleotides, nucleic acids, cells, and the like (U.S. Pat. No. 7,150,862 B2 is an example of the related art).

More specifically, in a case where a protein is separated from a sample containing proteins, the hydroxyapatite powder is widely used as an adsorbent which is used for a column of separating the biologically-relevant materials (proteins). If the protein is an acid protein, carboxyl groups included in a chemical structure of the acid protein make coordinate bonds with the calcium ions of the hydroxyapatite powder, thereby adsorbing the acid protein by the hydroxyapatite powder. Further, if the protein is a basic protein, amino groups contained in a chemical structure of the basic protein make ion bonds with the phosphate groups of the hydroxyapatite powder, thereby adsorbing the basic protein by the hydroxyapatite powder. Therefore, the protein is separated from the sample containing the proteins due to differences among adsorption capabilities of the proteins with respect to the hydroxylapatite powder.

In separation columns including such hydroxyapatite powder as an adsorbent (that is, an adsorption apparatus), recently, not only a separation column for industrial use but also a separation column for research and development use tend to become large in size. This tendency results in increase of a pressure applied to the hydroxyapatite powder which has been filled into the separation column as the adsorbent. By increasing such a pressure applied to the adsorbent (hydroxyapatite powder), the adsorbent is crushed when the adsorbent is filled into the separation column or the separation column is being used actually. As a result, a filter provided in one end of the separation column is cologged with the crushed adsorbent. Therefore, there is a problem in that frequent exchange of the adsorbent is needed.

In order to solve such a problem, recently, attention has been paid to powder (fluoroapatite powder) constituted of fluoroapatite which is produced by substituting at least a part of hydroxyl groups of hydroxyapatite by fluorine atoms (JP-A 2004-330113 is an example of the related art).

This fluoroapatite has substantially the same crystal (chemical) structure as that of hydroxyapatite, and therefore has substantially the same adsorption characteristics (adsorption capability) to the biologically-relevant materials such as proteins and the like as those of hydroxyapatite. Further, the fluoroapatite powder is a more stable material as compared with the hydroxyapatite powder. Therefore, since the fluoroapatite powder has properties such as improved particle strength and high acid resistance, attention has also been paid to the fluoroapatite powder.

However, even if the fluoroapatite powder is used as an adsorbent for a separation column, in a case where the separation column is used as a column for industrial use which is large in size, it cannot be said that the fluoroapatite powder has sufficient particle strength to be required to the adsorbent.

SUMMARY OF THE INVENTION

It is an object of the present invention to provide a method of producing fluoroapatite powder mainly constituted of fluoroapatite having improved particle strength, and fluoroapatite powder having the improved particle strength. Further, it is another object of the present invention to provide an adsorption apparatus using such fluoroapatite powder as an adsorbent.

These objects are achieved by the present inventions (1) to (14) described below.

(1) A method of producing a fluoroapatite powder by using a calcium compound, a phosphate compound, and a fluorine compound as a raw material is provided. The method comprises: preparing a slurry containing fluoroapatite produced from the raw material by using a wet process; applying an ultrasonic wave to the slurry; and drying the slurry to obtain the fluoroapatite powder mainly constituted of the fluoroapatite.

According to the method described above, it is possible to produce fluoroapatite powder having excellent particle strength.

(2) In the method described in the above-mentioned item (1), the step of applying the ultrasonic wave to the slurry is carried out after the fluoroapatite is produced.

According to the method described above, it is possible to produce fluoroapatite powder having excellent particle strength.

(3) In the method described in the above-mentioned item (1), the step of applying the ultrasonic wave to the slurry is carried out by using an ultrasonic washing machine having an ultrasonic tank containing water, wherein the slurry is put in a container and then the container containing the slurry is put in the ultrasonic tank. In such a state, when a total amount of the slurry and the water is 180 L, a power of the ultrasonic wave to be applied to the slurry is in the range of 500 to 2500 W.

According to the method described above, it is possible to reliably produce fluoroapatite powder having excellent particle strength.

(4) In the method described in the above-mentioned item (1), a time of applying the ultrasonic wave to the slurry is in the range of 10 minutes to 10 hours.

According to the method described above, it is possible to reliably produce fluoroapatite powder having excellent particle strength.

(5) In the method described in the above-mentioned item (1), an amount of the fluoroapatite contained in the slurry is 20 wt % or less.

According to the method described above, it is possible to uniformly apply the ultrasonic wave to fluoroapatite contained in the slurry.

(6) In the method described in the above-mentioned item (1), the calcium compound is calcium hydroxide.

According to the method described above, it is possible to efficiently and easily produce fluoroapatite powder and easily obtain a slurry containing the fluoroapatite.

(7) In the method described in the above-mentioned item (1), the phosphate compound is phosphoric acid.

According to the method described above, it is possible to efficiently and easily produce fluoroapatite powder and easily obtain a slurry containing the fluoroapatite.

(8) In the method described in the above-mentioned item (1), the fluorine compound is hydrogen fluoride.

According to the method described above, it is possible to produce fluoroapatite powder containing no by-products or extremely less by-products as compared with a method of producing fluoroapatite which use other fluorine compounds as a fluorine source. Therefore, it is possible to improve acid resistance and particle strength of fluoroapatite by reducing an amount of impurities (by-products) contained in the fluoroapatite.

(9) In the method described in the above-mentioned item (1), the slurry containing the fluoroapatite is obtained by reacting the calcium compound and the phosphate compound to obtain a slurry containing hydroxyapatite having hydroxyl groups, and then reacting the hydroxyapatite and the fluorine compound having fluorine atoms, thereby substituting at least a part of the hydroxyl groups of the hydroxyapatite by the fluorine atoms of the fluorine compound.

According to the method described above, it is possible to reliably produce fluoroapatite in the slurry.

(10) In the method described in the above-mentioned item (1), the slurry containing the fluoroapatite is obtained by preparing a slurry containing the calcium compound and a mixture of the phosphate compound and the fluorine compound having fluorine atoms, and then dropping the mixture to the slurry containing the calcium compound to obtain hydroxyapatite having hydroxyl groups, thereby substituting at least a part of the hydroxyl groups of the hydroxyapatite by the fluorine atoms of the fluorine compound.

According to the method described above, it is possible to reliably produce fluoroapatite in the slurry.

(11) Fluoroapatite powder produced by using the method described in the above-mentioned item (1).

According to the fluoroapatite powder described above, the thus obtained fluoroapatite has excellent particle strength.

(12) Fluoroapatite powder is mainly comprised of fluoroapatite. The fluoroapatite powder is obtained by drying a slurry containing the fluoroapatite. The fluoroapatite is obtained from hydroxyapatite having hydroxyl groups and a fluorine compound having fluorine atoms, and at least a part of the hydroxyl groups of the hydroxyapatite is substituted by the fluorine atoms of the fluorine compound. When the fluoroapatite powder of which average particle size is 40±5 μm are classified, and then a compressive particle strength of the classified fluoroapatite powder is measured, the compressive particle strength is 5.4 MPa or more.

According to the fluoroapatite powder described above, the fluoroapatite powder having such compressive particle strength has excellent particle strength.

(13) An adsorption apparatus including an adsorbent constituted of the fluoroapatite powder described in the above-mentioned item (11) or (12), or sintered particles obtained by sintering the fluoroapatite powder.

According to the adsorption apparatus described above, since the fluoroapatite powder to be used as an adsorbent has excellent particle strength, it is possible to use the fluoroapatite powder reliably as an adsorbent used for a separation column for industrial use which is large in size.

(14) An adsorption apparatus including an adsorbent constituted of the fluoroapatite powder described in the above-mentioned item (11) or (12), or sintered particles obtained by sintering the fluoroapatite powder. When a liquid containing a plurality of proteins is supplied to the adsorption apparatus, the plurality of proteins are adsorbed by the adsorbent so that the plurality of proteins are separated to each other due to a difference of adsorption capabilities between the plurality of proteins and the adsorbent.

According to the adsorption apparatus described above, since the fluoroapatite powder to be used as an adsorbent has excellent particle strength, even if the fluoroapatite powder is used as an adsorbent used for a separation column for industrial use which is large in size, it is possible reliably to separate proteins contained in the liquid to each other.

According to the present invention, since the fluoroapatite powder is produced by using the slurry containing fluoroapatite to which the ultrasonic wave is applied, the thus obtained fluoroapatite powder has improved particle strength. Further, since the thus obtained fluoroapatite powder has such improved particle strength, it is possible to use the fluoroapatite powder reliably as an adsorbent used for a separation column for industrial use which is large in size.

BEST MODE FOR CARRYING OUT THE INVENTION

Hereinbelow, a method of producing fluoroapatite powder, fluoroapatite powder, and an adsorption apparatus according to the present invention will be described in detail with reference to their preferred embodiments.

First, a description will be made on a method of producing fluoroapatite powder according to the present invention. The method of producing the fluoroapatite powder according to the present invention includes a first step and a second step. The first step is a step that an ultrasonic wave is applied to a slurry containing fluoroapatite which is produced by a wet process using a calcium source (calcium compound), a phosphate source (phosphate compound), and fluorine source (fluorine compound) as a raw material. The second step is a step that fluoroapatite powder mainly constituted of fluoroapatite is obtained by drying the slurry containing this fluoroapatite.

<First Method of Producing Fluoroapatite Powder>

Hereinafter, first, a first method of producing the fluoroapatite powder according to the present invention will be described.

The first method of producing the fluoroapatite powder (hereinafter, simply referred to as "first method") according to the present invention includes a hydroxyapatite slurry preparation step (S1), a hydrogen fluoride-containing solution preparation step (S2), a fluoroapatite synthesis step (S3), and a fluoroapatite drying step (S4). Hereinbelow, these steps will be described in order.

<S1> Hydroxyapatite Slurry Preparation Step

First, a slurry containing hydroxyapatite is prepared.

Hereinbelow, a method of preparing the slurry will be described. The slurry containing hydroxyapatite can be obtained by various synthesis methods, but are preferably synthesized by a wet synthesis method in which at least one of a calcium source (calcium compound) and a phosphate source (phosphate compound) is used in the form of a solution. By using such a wet synthesis method, it is possible to form fine hydroxyapatite (hydroxyapatite primary particles) in the slurry and thereby to obtain a slurry (hydroxyapatite slurry) in which hydroxyapatite are uniformly dispersed.

Further, such a wet synthesis method does not need expensive production equipment, and makes it possible to simply prepare a slurry and efficiently synthesize hydroxyapatite to produce the slurry containing hydroxyapatite.

Examples of the calcium compound to be used in the wet synthesis of the present invention include calcium hydroxide, calcium oxide, calcium nitrate and the like. Examples of the phosphate compound to be used in the wet synthesis of the present invention include phosphoric acid, ammonium phosphate and the like. Among them, one mainly containing calcium hydroxide is particularly preferred as the calcium compound, and one mainly containing the phosphoric acid is particularly preferred as the phosphate compound.

By using such calcium compound and phosphate compound, it is possible to more efficiently and cheaply produce hydroxyapatite. Further, it is also possible to easily obtain a slurry containing hydroxyapatite.

More specifically, such hydroxyapatite and slurry can be obtained by dropping a phosphoric acid ($H_3PO_4$) solution into a suspension of calcium hydroxide ($Ca(OH)_2$) contained in a container and mixing them by stirring.

An amount of hydroxyapatite contained in the slurry is preferably in the range of about 1 to 20 wt %, and more preferably in the range of about 5 to 12 wt %. This makes it possible to more efficiently produce fluoroapatite by substituting hydroxyl groups of hydroxyapatite with fluorine atoms in the step S3 which will be described later. In addition, it is also possible to sufficiently stir the slurry with relatively low energy in the step S3 which will be described later and thereby to make an uniform rate of substitution of the hydroxyl groups of hydroxyapatite by the fluorine atoms among particles of hydroxyapatite contained in the slurry.

<S2> Hydrogen Fluoride-Containing Solution Preparation Step

On the other hand, in the first method, a solution containing hydrogen fluoride is prepared separately from the slurry containing hydroxyapatite as the fluorine source.

A solvent for dissolving hydrogen fluoride is not particularly limited, and any solvent can be used as long as it does not inhibit a reaction to be carried out in the step S3 which will be described later.

Examples of such a solvent include water, an alcohol such as methanol and ethanol, and the like. These solvents may be used in combination of two or more of them. However, among them, water is particularly preferred. By using water as a solvent, it is possible to more reliably prevent the inhibition of the reaction to be carried out in the step S3 which will be described later.

An amount of hydrogen fluoride contained in the hydrogen fluoride-containing solution is preferably in the range of about 1 to 60 wt %, and more preferably in the range of about 2.5 to 10 wt %. By setting the amount of hydrogen fluoride contained in the hydrogen fluoride-containing solution to a value within the above range, it is possible to easily adjust a pH of the slurry in which the hydrogen fluoride-containing solution is added to a value within a desired range in the step S3 which will be described later. In addition, it is also possible to prevent the hydrogen fluoride-containing solution from reaching an extremely low pH and thereby to handle the hydrogen fluoride-containing solution safely.

In this step, hydrogen fluoride (HF) has been used as the fluorine source. However, ammonium hydrogen fluoride ($NH_4F$), lithium fluoride (LiF), sodium fluoride (NaF), potassium fluoride (KF), magnesium fluoride ($MgF_2$), calcium fluoride ($CaF_2$), or the like can be used as the fluorine source in addition to hydrogen fluoride.

By using hydrogen fluoride as the fluorine source as this step, no by-product is formed or an amount of a formed by-product is extremely small as compared with a case where fluorine compounds other than hydrogen fluoride are used as the fluorine source. Therefore, an amount of an impurity (by-product) contained in the fluoroapatite can be made small so that acid resistance and particle strength of fluoroapatite can be improved. It is to be noted that the term "impurity" used herein means ammonia, lithium or the like derived from a raw material of fluoroapatite.

<S3> Fluoroapatite Synthesis Step

Then, the hydroxyapatite slurry prepared in the step <S1> and the hydrogen fluoride-containing solution prepared in the step <S2> are mixed together to react hydroxyapatite with hydrogen fluoride in the hydroxyapatite slurry containing the hydrogen fluoride-containing solution by a wet method. This makes it possible to obtain fluoroapatite.

More specifically, as shown in the following formula (I), by bringing hydroxyapatite into contact with hydrogen fluoride, it is possible to substitute at least a part of the hydroxyl groups of hydroxyapatite by the fluorine atoms of hydrogen fluoride molecules to convert hydroxyapatite into fluoroapatite and thereby to obtain fluoroapatite (fluoroapatite primary particles).

$$Ca_{10}(PO_4)_6(OH)_2 \rightarrow Ca_{10}(PO_4)_6(OH)_{2-2x}F_{2x} \qquad (I)$$

(wherein $0 < x \leq 1$)

As described above, by reacting hydroxyapatite with hydrogen fluoride in the slurry containing hydroxyapatite, it is possible to easily produce fluoroapatite.

Further, since the hydroxyl groups of hydroxyapatite are substituted by the fluorine atoms during a stage of hydroxyapatite primary particles, the obtained fluoroapatite have a particularly high rate of substitution of the hydroxyl groups by the fluorine atoms.

Further, since hydrogen fluoride (HF) is used as the fluorine source as the step <S2>, the amount of the impurity (by-product) contained in the fluoroapatite can be made small as described above so that acid resistance and particle strength of fluoroapatite can be improved.

An impurity content of fluoroapatite is preferably as small as possible. For example, it is preferably 300 ppm or less, and more preferably 100 ppm or less. This makes it possible to further improve acid resistance of fluoroapatite due to their low impurity content.

According to the present invention, by adjusting the reaction conditions (e.g., pH, temperature, time) of the reaction between hydroxyapatite and hydrogen fluoride, it is possible to allow the impurity content contained in the produced fluoroapatite to fall within the above range.

Particularly, according to the present invention, the pH of the hydroxyapatite slurry to which the hydrogen fluoride-containing solution is added is adjusted to fall within the range of 2.5 to 5 by using the hydrogen fluoride-containing solution as a solution containing hydrogen fluoride (source), and in this state, hydroxyapatite reacts with hydrogen fluoride. In this regard, it is to be noted that in this specification, the pH of the hydroxyapatite slurry to which the hydrogen fluoride-containing solution is added means a pH value at the time when an entire amount of the hydrogen fluoride-containing solution is mixed with the slurry.

If the pH of the hydroxyapatite slurry is adjusted to less than 2.5, there is a tendency that hydroxyapatite itself dissolves, and therefore it becomes difficult to convert hydroxyapatite into fluoroapatite to obtain fluoroapatite. Further, in this case, there is also a problem that constituent materials of a device for use in mixing hydroxyapatite with the hydrogen fluoride-containing solution are eluted into the hydroxyapatite slurry so that low-purity fluoroapatite are obtained. Furthermore, it is technically very difficult to adjust the pH of the slurry containing fluoroapatite (to which the hydrogen fluoride-containing solution is added) to a low value less than 2.5 using the hydrogen fluoride-containing solution.

On the other hand, in order to adjust the pH of the hydroxyapatite slurry to which the hydrogen fluoride-containing solution is added to more than 5 using the hydrogen fluoride-containing solution, a large amount of water has to be added to the slurry. In this case, a total amount of the slurry becomes extremely large, and as a result, a yield of fluoroapatite based on the total amount of the slurry is lowered. This is industrially disadvantageous.

In contrast to the above two cases, in a case where the pH of the hydroxyapatite slurry to which the hydrogen fluoride-containing solution is added is adjusted to fall within the range of 2.5 to 5, fluoroapatite produced by the reaction once tends to dissolve and is then recrystallized. Therefore, fluoroapatite having high crystallinity can be obtained.

It is to be noted that as described above, the pH of the hydroxyapatite slurry to which the hydrogen fluoride-containing solution is added shall be adjusted to fall within the range of 2.5 to 5, but is preferably adjusted to fall within the range of about 2.5 to 4.5, and more preferably in the range of about 2.7 to 4. By adjusting the pH of the hydroxyapatite slurry to which the hydrogen fluoride-containing solution is added to a value within the above range, it is possible to more easily obtain fluoroapatite having high crystallinity in good yield.

The hydroxyapatite slurry and the hydrogen fluoride-containing solution may be mixed together at one time, but they are preferably mixed by adding (dropping) the hydrogen fluoride-containing solution into the hydroxyapatite slurry drop by drop. By dropping the hydrogen fluoride-containing solution into the hydroxyapatite slurry, it is possible to relatively easily react hydroxyapatite with hydrogen fluoride and to more easily and reliably adjust the pH of the slurry to a value within the above range. Therefore, it is possible to prevent decomposition or dissolution of hydroxyapatite itself and thereby to obtain high-purity fluoroapatite in a good yield.

A rate of dropping the hydrogen fluoride-containing solution into the hydroxyapatite slurry is preferably in the range of about 1 to 20 L/hr, and more preferably in the range of about 3 to 10 L/hr. By mixing (adding) the hydrogen fluoride-containing solution with (to) the hydroxyapatite slurry at such a dropping rate, it is possible to react hydroxyapatite with hydrogen fluoride under milder conditions.

Further, the reaction between hydroxyapatite and hydrogen fluoride is preferably carried out while the hydroxyapatite slurry is stirred. By stirring the hydroxyapatite slurry, it is possible to bring hydroxyapatite into uniform contact with hydrogen fluoride and thereby to allow the reaction between hydroxyapatite and hydrogen fluoride to efficiently proceed. In addition, it is also possible to obtain fluoroapatite more uniform in the rate of substitution of the hydroxyl groups of hydroxyapatite by the fluorine atoms. In case where an adsorbent is produced by using such fluoroapatite powder (dried particles) or sintered particles thereof, it is possible for the adsorbent to have less characteristic variations and high reliability.

In this case, a power for stirring the hydroxyapatite slurry is preferably in the range of about 1 to 10 kW, and more preferably in the range of about 1 to 5 kW per 1 liter of the slurry. By setting the stirring power to a value within the above range, it is possible to further improve the efficiency of the reaction between hydroxyapatite and hydrogen fluoride.

An amount of hydrogen fluoride to be mixed is determined so that an amount of the fluorine atoms becomes preferably in the range of about 0.65 to 1.25 times, and more preferably in the range of about 0.75 to 1.15 times with respect to an amount of the hydroxyl groups of hydroxyapatite. This makes it possible to more efficiently substitute the hydroxyl groups of hydroxyapatite by the fluorine atoms.

A temperature of the reaction between hydroxyapatite and hydrogen fluoride is not particularly limited to a specific value, but is preferably in the range of about 5 to 50° C., and more preferably in the range of about 20 to 40° C. By setting the temperature to a value within the above range, it is possible to prevent decomposition or dissolution of hydroxyapatite even when the pH of the hydroxyapatite slurry is adjusted to a low value. Further, it is also possible to improve a reaction rate between hydroxyapatite and hydrogen fluoride. Furthermore, it is also possible to efficiently promote recrystallization of the produced fluoroapatite and thereby to obtain fluoroapatite.

In this case, the hydrogen fluoride-containing solution is preferably dropped (added) into (to) the hydroxyapatite slurry for a length of time from about 30 minutes to 16 hours, and more preferably for a length of time from about 1 to 8 hours. By dropping hydrogen fluoride into the hydroxyapatite slurry in such a period of time to react hydroxyapatite with hydrogen fluoride, it is possible to sufficiently substitute the hydroxyl groups of hydroxyapatite by the fluorine atoms. It is to be noted that even if the time for dropping the hydrogen fluoride into the hydroxyapatite slurry is prolonged to exceed the above upper limit value, it cannot be expected that the reaction between hydroxyapatite and hydrogen fluoride will further proceed.

This fluoroapatite is not limited to pure fluoroapatite as shown by the formula (I) described above wherein degree of halogenation represented as x is 1 (i.e., fluoroapatite obtained by substituting all the hydroxyl groups of hydroxyapatite by the fluorine atoms). Fluoroapatite also includes one obtained by substituting only part of the hydroxyl groups of hydroxyapatite by the fluorine atoms.

Further, in a case where hydrogen fluoride is used as the fluorine source like this embodiment, it is possible to substitute the hydroxyl groups of hydroxyapatite present not only in the surface but also in the inside portion of hydroxyapatite by the fluorine atoms. More specifically, it is possible to substitute 75% or more of the hydroxyl groups of hydroxyapatite by the fluorine atoms. Further, by appropriately regulating the reaction conditions (e.g., pH, temperature, time, amount of hydrogen fluoride to be mixed) of the reaction between hydroxyapatite and hydrogen fluoride, it is also possible to substitute 95% or more of the hydroxyl groups of hydroxyapatite by the fluorine atoms. It is to be noted that fluoroapatite obtained by substituting 50% or more of the hydroxyl groups of hydroxyapatite by the fluorine atoms is preferred because it has particularly excellent acid resistance.

Further, such fluoroapatite contain a very little amount of an impurity, and are therefore excellent in acid resistance and particle strength.

As described above, it is possible to obtain fluoroapatite in which at least a part of the hydrogen groups of hydroxyapatite is substituted by the fluorine atoms.

A chemical structure of such fluoroapatite (fluoroapatite primary particles) includes positively-charged parts (calcium site) and negatively-charged parts (phosphoric acid site). Therefore, Van der Waals' forces (intermolecular force) are made between the positively-charged parts in the chemical structure of one fluoroapatite primary particle of the fluoroapatite primary particles and the negatively-charged parts in the chemical structure of the other fluoroapatite primary particle of the fluoroapatite primary particles. By this Van der Waals' forces, the one fluoroapatite primary particle and the other fluoroapatite primary particle adhere to each other to obtain a pre-aggregate. Then, in the surly, pre-aggregates are agglutinated to obtain aggregates of the fluoroapatite primary particles (hereinafter, simply referred to as "aggregates").

Figure 1:
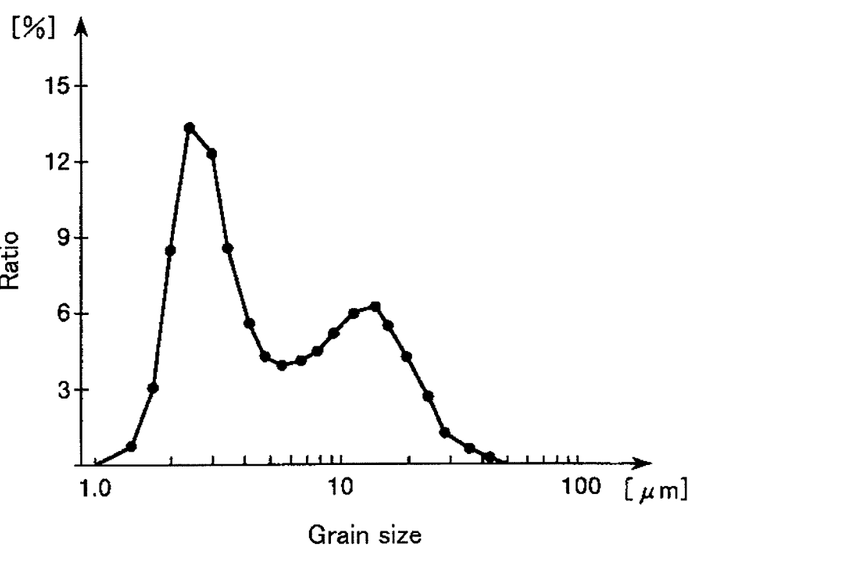
FIG. 1 is a frequency distribution curve of a grain size distribution of aggregates constituted of fluoroapatite contained in a slurry.

By studying of the present inventors, it has been found that grain sizes of such aggregates are distributed as shown in FIG. 1. When a frequency distribution curve of the grain size distribution of the aggregates is obtained according to sizes of the aggregates depending on a relation between attractive force and repulsive force which occur among the aggregates, the frequency distribution curve has two peaks which include many aggregates as shown in FIG. 1. In this regard, the two peaks include one peak in which a grain size is small and the other peak in which a grain size is large. Hereinafter, in this specification, the aggregates included in one peak of the frequency distribution curve shown in FIG. 1 mean "first aggregates" and the aggregates included in the other peak of the frequency distribution curve shown in FIG. 1 mean "second aggregates".

One of features of the present invention resides in that an ultrasonic wave is applied to the surly containing fluoroapatite (fluoroapatite primary particles) which form the aggregates containing such first and second aggregates. By drying the slurry to which the ultrasonic wave is applied in the next step <S4>, fluoroapatite is granulated to obtain fluoroapatite powder (dried particles). This fluoroapatite powder has excellent particle strength.

Meantime, when fluoroapatite is produced and/or after fluoroapatite is produced, the following facts are known by stirring the slurry and controlling a power for stirring the slurry. The facts include that the grain sizes of the first and second aggregates are adjusted and an abundance ratio between the first and second aggregates is adjusted. Further, when the fluoroapatite powder is produced by drying the slurry containing the aggregates in which the abundance ratio of the first aggregates is large, it is known that the particle strength of the fluoroapatite powder is improved.

In contrast, even if the ultrasonic wave is applied to the slurry containing the aggregates, it was found by studying of the present inventors that the abundance ratio between the first and second aggregates is not changed. In other words, it was found that no destruction (crush) of the second aggregates occurs due to the ultrasonic wave. It is conceived that another factor different from the abundance ratio between the first and second aggregates contributes to the improvement of the particle strength due to the ultrasonic wave.

An amount of the fluoroapatite primary particles and the aggregates thereof contained in the slurry is not limited to a specific value, but preferably 20 wt % or less, and more preferably in the range of about 5 to 15 wt %. This makes it possible to uniformly apply the ultrasonic wave to the fluoroapatite primary particles contained in the slurry.

The slurry is put in an airtight container, and then the airtight container including the slurry is put (immersed) in water included in an ultrasonic tank of an ultrasonic washing machine. In such a state, in a case where the ultrasonic wave is applied to the slurry, when a total amount of the slurry and water is 180 L, a power of the ultrasonic wave to be applied to the slurry is preferably in the range of about 500 to 2500 W, and more preferably in the range of about 1200 to 2000 W.

A frequency of the ultrasonic wave is not limited to a specific value, but preferably in the range of about 10 to 50 kHz, and more preferably in the range of about 25 to 40 kHz.

A time of applying the ultrasonic wave to the slurry is preferably in the range of about 10 minutes to 10 hours, and more preferably in the range of about 1 to 5 hours.

By setting each of the above conditions of applying the ultrasonic wave to the slurry to a value within the above range, it is possible for the obtained fluoroapatite powder to reliably obtain excellent particle strength without change of the abundance ratio between the first and second aggregates.

<S4> Fluoroapatite Drying Step

Next, the fluoroapatite slurry containing fluoroapatite is dried to granulate fluoroapatite. In this way, the fluoroapatite powder (dried particles) which is mainly constituted of fluoroapatite is obtained.

Since the ultrasonic wave is applied to the slurry containing fluoroapatite in the above step <S2>, the fluoroapatite powder (dried particles) obtained in this step has excellent particle strength.

In this regard, a method of obtaining the fluoroapatite powder by drying the fluoroapatite slurry containing fluoroapatite and granulating fluoroapatite is not particularly limited a specific method, but an example of such a method includes a spray drying method using a spray drier and the like.

A drying temperature of the fluoroapatite slurry is preferably in the range of about 75 to 250° C., and more preferably in the range of about 95 to 200° C. By setting the drying temperature to a value within the above range, it is possible to obtain dried particles having excellent particle strength (mechanical strength) while gaps (pores) are allowed to remain in fluoroapatite or between particles of fluoroapatite adjacent to each other (i.e., in aggregates).

An average particle size (grain size) of particles of fluoroapatite powder produced by granulation of the fluoroapatite primary particles is preferably in the range of about 10 to 100 μm, and more preferably in the range of about 30 to 90 μm. By setting the average particle size to a value within the above range, it is possible to obtain fluoroapatite powder having excellent acid resistance and particle strength.

In this regard, it is to be noted that such fluoroapatite powder (dried particles) can be sintered to obtain sintered particles.

In this case, a sintering temperature of the fluoroapatite powder is preferably in the range of about 200 to 800° C., and more preferably in the range of about 400 to 700° C. In this case, particle strength of the fluoroapatite powder is improved by sintering the fluoroapatite powder. By completing the steps as described above, it is possible to produce fluoroapatite powder.

The level of the particle strength of the fluoroapatite powder can be determined by, for example, the following method.

More specifically, the fluoroapatite powder is classified so that an average particle size of the particles of the fluoroapatite powder becomes 40 µm±5 µm, and then compressive particle strength of the classified particles of the fluoroapatite powder is measured to determine the level of the particle strength of the fluoroapatite powder.

The compressive particle strength measured in this way is preferably as large as possible. More specifically, the compressive particle strength is preferably 5.4 MPa or more, and more preferably 5.9 MPa or more. This makes it possible to make a determination that the fluoroapatite powder having such compressive particle strength has very improved particle strength.

In this first method, it is to be noted that a first step included in the method of producing fluoroapatite powder according to the present invention is composed of the steps <S1> to <S3> and a second step included in the method of producing fluoroapatite powder according to the present invention is composed of the step <S4>.

<Second Method of Producing Fluoroapatite Powder>

Next, a second method of producing the fluoroapatite powder according to the present invention will be described.

The second method of producing the fluoroapatite powder (hereinafter, simply referred to as "second method") according to the present invention includes a liquid preparation step (S1'), a fluoroapatite synthesis step (S2'), and a fluoroapatite drying step (S3'). Hereinbelow, these steps will be described in order.

<S1'> Liquid Preparation Step (First Step)

<S1'-1> Calcium Source-Containing Solution Preparation Step

First, a calcium source-containing solution containing a calcium compound containing calcium as a calcium source is prepared.

The same one as the calcium compound described in the first method can be used as a calcium source.

A solution or suspension containing the calcium compound as the calcium source can be used as the calcium source-containing solution. In a case where the calcium compound is calcium hydroxide, a calcium hydroxide suspension in which calcium hydroxide is suspended in water is used preferably. If fluoroapatite is produced by using such a calcium hydroxide suspension in the fluoroapatite synthesis step (S2), it is possible to obtain fine fluoroapatite. Further, even if aggregates in which the fine fluoroapatite are agglutinated are obtained, the aggregates are uniformly dispersed in such a calcium hydroxide suspension.

An amount of the calcium compound as the calcium source contained in the calcium source-containing solution is preferably in the range of about 1 to 20 wt %, and more preferably in the range of about 5 to 12 wt %. This makes it possible to more efficiently produce fluoroapatite in the step <S2'> described later. Further, it is also possible to sufficiently stir the calcium source-containing solution (solution or suspension) at relatively low energy in the step <S2'> described later. Furthermore, since the calcium source-containing solution can be stirred sufficiently, the hydroxyl groups of hydroxyapatite can be uniformly substituted by the fluorine atoms among the fluoroapatite primary particles to be produced.

<S1'-2> Hydrogen Fluoride-Containing Solution Preparation Step

Next, a hydrogen fluoride-containing solution containing hydrogen fluoride as a fluorine source is prepared.

The same one as the hydrogen fluoride-containing solution described in the first method can be used as a hydrogen fluoride-containing solution.

<S1'-3> Phosphate Source-containing Solution Preparation Step

Next, a phosphate source-containing solution containing phosphoric acid as a phosphate acid source is prepared. The same one as the phosphate compound described in the first method can be used as a phosphate source.

A solvent for dissolving phosphoric acid is not particularly limited to a specific solvent, but any solvent can be used as long as it does not inhibit a reaction to be carried out in the step <S2'>. The same solvent can be used as the solvent for dissolving the hydrogen fluoride in the first method described above.

It is to be noted that both the solvent for dissolving hydrogen fluoride and the solvent for dissolving phosphoric acid are preferably the same kind of solvent or the same solvent. This makes it possible to uniformly mix the hydrogen fluoride-containing solution and the phosphate source-containing solution to the calcium source-containing solution in a first mixture obtained in the step <S2'> which will be described later. As a result, it is possible to produce fluoroapatite having a uniform ratio of substituting the hydroxyl groups of hydroxyapatite by the fluorine atoms of the hydrogen fluoride molecules.

A first mixture may be obtained by mixing the calcium source-containing solution, the phosphate source-containing solution and the hydrogen fluoride-containing solution prepared as described above, but the mixing order thereof is not limited as long as the calcium compound (calcium source), hydrogen fluoride and phosphate compound (phosphate source) can be simultaneously existed in the first mixture in which the calcium source-containing solution, the hydrogen fluoride-containing solution, and the phosphate source-containing solution are mixed in the step <S2'> described later. However, it is preferred that the hydrogen fluoride-containing solution is mixed with the phosphate source-containing solution to obtain a second mixture, and then the second mixture is added to the calcium source-containing solution to obtain the first mixture. By mixing the calcium source-containing solution, the hydrogen fluoride-containing solution, and the phosphate source-containing solution in this order, the hydrogen fluoride-containing solution and the phosphate source-containing solution can be uniformly mixed with the calcium source-containing solution. Further, the hydroxyl groups of hydroxyapatite can be uniformly substituted by the fluorine atoms. Furthermore, it is possible to reliably prevent or suppress a by-product such as calcium fluoride from being produced.

In this regard, it is to be noted that examples of a method of obtaining the first mixture other than the method described above include: a method of substantially simultaneously adding the hydrogen fluoride-containing solution and the phosphate source-containing solution to the calcium source-containing solution; a method of substantially simultaneously adding the calcium source-containing solution and the phosphate source-containing solution to the hydrogen fluoride-containing solution; and a method of substantially simultaneously adding the calcium source-containing solution and the hydrogen fluoride-containing solution to the phosphate source-containing solution.

Hereinafter, a description will be made, as a representative, with respect to the case where after the second mixture is prepared, the second mixture is mixed with the calcium source-containing solution to obtain the first mixture, thereby producing fluoroapatite.

<S1'-4> Second Mixture Preparation Step

Next, the hydrogen fluoride-containing solution and the phosphate source-containing solution, which are prepared in the steps <S1'-2> and <S1'-3>, respectively, are mixed to each other to obtain the second mixture.

An amount of hydrogen fluoride contained in the second mixture is preferably in the range of about 0.5 to 60 wt %, and more preferably in the range of about 1.0 to 10 wt %. By setting the amount of hydrogen fluoride contained in the second mixture to a value within the above range, it is possible to improve a ratio of substituting the hydroxyl groups of hydroxyapatite by the fluorine atoms of the hydrogen fluoride molecules in the production of fluoroapatite in the step <S2'> described later. Further, a pH of the first mixture in the production of fluoroapatite can also be set in an appropriate range due to such an amount of hydrogen fluoride. Furthermore, hydrogen fluoride has strong acidity. However, since a pH of the second mixture does not become extremely low due to such an amount of the hydrogen fluoride, the second mixture can be handled (treated) safely.

An amount of phosphoric acid (phosphate source) contained in the second mixture is preferably in the range of about 1.0 to 90 wt %, and more preferably in the range of about 5.0 to 20 wt %. By setting the amount of the phosphoric acid contained in the second mixture to a value within the above range, fluoroapatite can be efficiently produced in the step <S2'> described above. Furthermore, since a pH of the second mixture does not become extremely low due to such an amount of phosphoric acid, the second mixture can be handled (treated) safely.

An amount of phosphoric acid contained in the second mixture is preferably in the range of about 1.0 to 4.5 times, and more preferably in the range of about 2.0 to 4.0 times with respect to hydrogen fluoride contained in the second mixture at a mol amount. This makes it possible to efficiently produce fluoroapatite having a high ratio of substituting the hydroxyl groups of hydroxyapatite by the fluorine atoms.

<S2'> Fluoroapatite Synthesis Step

Next, the calcium source-containing solution prepared in the step <S1'-1> described above is mixed with the second mixture obtained in the step <S1'-4> described above to obtain the first mixture. Then, the calcium compound as the calcium source is reacted with hydrogen fluoride and phosphoric acid in the first mixture to thereby obtain fluoroapatite (fluoroapatite primary particles).

More specifically, in a case where calcium hydroxide is used as the calcium source and phosphoric acid is used as the phosphate source, by bringing calcium hydroxide into contact with hydrogen fluoride and phosphoric acid, it is possible to obtain fluoroapatite as shown in the formula (I) described above.

As described above, fluoroapatite which is the same as that described in the first method can be reliably produced by bringing hydrogen fluoride and phosphoric acid into contact with the calcium compound (calcium hydroxide) as the calcium source, and then reacting hydrogen fluoride, phosphoric acid and the calcium compound with simple handling that the calcium source-containing solution is mixed with the second mixture.

A rate of dropping the second mixture into the calcium source-containing solution is preferably in the range of about 1 to 100 L/hr, and more preferably in the range of about 10 to 100 L/hr. By mixing (adding) the second mixture with (to) the calcium source-containing solution at such a dropping rate, it is possible to react the calcium compound, hydrogen fluoride and phosphoric acid under milder conditions.

Further, the reaction among the calcium compound, hydrogen fluoride and phosphoric acid is preferably carried out while the first mixture is stirred. By stirring the first mixture, it is possible to bring the calcium compound into uniformly contact with hydrogen fluoride and phosphoric acid and thereby to allow the reaction among the calcium compound, hydrogen fluoride and phosphoric acid to efficiently proceed. In addition, the hydroxyl groups of hydroxyapatite are uniformly substituted by the fluorine atoms of the hydrogen fluoride molecules (hydrogen fluoride) among the particles of the obtained fluoroapatite powder. In a case where fluoroapatite powder (dried particles) or the sintered body thereof (sintered particles) is used as the adsorbent, it is possible for the adsorbent to have less characteristic variations and high reliability.

In this case, a power for stirring the first mixture (slurry) is preferably in the range of about 0.5 to 3 W, and more preferably in the range of about 0.9 to 1.8 W per 1 liter of the slurry. By setting the stirring power to a value within the above range, it is possible to further improve the efficiency of the reaction among the calcium compound as the calcium source, hydrogen fluoride and phosphoric acid as the phosphate source.

A temperature of the reaction among the calcium compound as the calcium source, hydrogen fluoride and phosphoric acid as the phosphate source is not particularly limited to a specific value, but is preferably in the range of about 5 to 50° C., and more preferably in the range of about 20 to 40° C. By setting the temperature to a value within the above range, it is possible to prevent decomposition or dissolution of the produced fluoroapatite even if a pH of the first mixture is adjusted to a relatively low value. Further, it is also possible to improve a reaction ratio among the calcium compound as the calcium source, hydrogen fluoride and phosphoric acid as the phosphate source.

In such a manner as described above, the calcium compound as the calcium source, hydrogen fluoride and phosphoric acid as the phosphate source are reacted so that a fluoroapatite slurry containing fluoroapatite is obtained.

The ultrasonic wave is applied to the fluoroapatite slurry containing fluoroapatite produced by carrying out the second method as described above, which is the same as that to the slurry containing fluoroapatite produced by carrying out the first method. By doing so, the fluoroapatite powder (dried particles) obtained by drying the slurry to which the ultrasonic wave is applied in the next step <S3'> has excellent particle strength.

<S3'> Fluoroapatite Drying Step

Next, the fluoroapatite slurry containing fluoroapatite is dried to granulate fluoroapatite. In this way, the fluoroapatite powder (dried particles) which is mainly constituted of fluoroapatite is obtained.

The same method as that described in the step <S4> can be used as a method of drying the fluoroapatite slurry.

By completing the steps as described above, it is possible to produce fluoroapatite powder. In this second method, it is to be noted that a first step included in the method of producing fluoroapatite powder according to the present invention is composed of the steps <S1'> and <S2'>, and a second step included in the method of producing fluoroapatite powder according to the present invention is composed of the step <S3'>.

In this embodiment, the description has been made in a case where the ultrasonic wave is applied to the slurry containing fluoroapatite after the production of fluoroapatite. However, timing that the ultrasonic wave is applied to the slurry is not limited thereto, but the ultrasonic wave may be applied to the slurry containing fluoroapatite during the production of fluoroapatite.

The fluoroapatite powder (dried particles) produced by the method of producing the fluoroapatite powder as described above or the sintered particles obtained by sintering the thus obtained fluoroapatite powder can be used as an adsorbent (stationary phase) of an adsorption apparatus used in chromatography.

If a liquid containing a plurality of proteins is supplied to such an adsorption apparatus and the liquid go thorough the stationary phase including the adsorbent of the adsorption apparatus, the plurality of proteins are adsorbed by the adsorbent, namely, fluoroapatite powder. Thereafter, in such a state, an eluate (buffer) is supplied to the stationary phase including the adsorbent of the adsorption apparatus, and then the plurality of proteins are discharged to different fractions due to a difference of adsorption between each protein and fluoroapatite powder (adsorbent), respectively. This makes it possible to separate the plurality of proteins to the different fractions containing the discharged eluate, respectively.

By using the fluoroapatite powder as the adsorbent of the adsorption apparatus used in chromatography, it is possible to expand the range of choices of conditions for separation or adsorption of an object to be tested (e.g., protein) and thereby to apply such an adsorption apparatus used in chromatography to a wider range of areas (fields).

The application of the fluoroapatite powder is not limited to such an adsorbent. For example, the fluoroapatite powder may be molded and then sintered to obtain a sintered body. The thus obtained sintered body can be used as artificial bone or dental root.

Although the method of producing the fluoroapatite powder, the fluoroapatite powder, and the adsorption apparatus according to the present invention have been described above with reference to their preferred embodiments, the present invention is not limited to these embodiments.

For example, the method of producing the fluoroapatite powder according to the present invention may further include one, two or more steps for any purpose.

EXAMPLES

Hereinbelow, the present invention will be described with reference to actual examples.

1. Production of Fluoroapatite

Example 1

First, calcium hydroxide (calcium source) was suspended in pure water to obtain a calcium hydroxide suspension, and then an aqueous phosphoric acid solution (phosphate source) was dropped into the calcium hydroxide suspension while the calcium hydroxide suspension was sufficiently stirred. As a result, 50 L of a slurry containing 10 wt % of hydroxyapatite was obtained.

It is to be noted that the thus obtained hydroxyapatite was found to be hydroxyapatite by powder X-ray diffractometry.

On the other hand, hydrogen fluoride (fluorine source) was dissolved in pure water so that an amount thereof is 4.2 wt % to prepare a hydrogen fluoride-containing solution.

Then, 4.8 L of the hydrogen fluoride-containing solution was dropped into the slurry at a rate of 2 L/hr while the slurry was stirred at a stirring power of 90 W.

It is to be noted that the slurry had a pH of 3.00 at the time when the dropping of the hydrogen fluoride-containing solution was completed.

Thereafter, the slurry was stirred at a stirring power of 90 W at 25° C. for 24 hours to react hydroxyapatite with hydrogen fluoride. As a result, a slurry containing fluoroapatite was obtained.

Next, 20 L of the thus obtained slurry containing fluoroapatite was put in a tank. Then, the tank was put in an ultrasonic tank provided with an ultrasonic washing machine (manufactured by SND CO., Ltd. under the trade name of "US-180MD"; a maximum power is 1900 W; a volume of the ultrasonic tank is 180 L). In such a state, the ultrasonic wave was applied to the slurry containing fluoroapatite under the conditions that a power was 1900 W and a time of applying the ultrasonic wave to the slurry was 3 hours.

In this regard, it is to be noted that 500 mL of the slurry was taken every 1 hour during applying the ultrasonic wave to the slurry containing fluoroapatite.

It is to be noted that a reaction product contained in the slurry after the ultrasonic wave was applied to the slurry was found to be fluoroapatite by powder X-ray diffractometry. Further, as a result of powder x-ray diffraction of fluoroapatite, a rate of substitution of the hydroxyl groups by the fluorine atoms was found to be about 88%.

Further, as a result of powder X-ray diffraction of dried particles of fluoroapatite, any products other than fluoroapatite were not detected.

Then, the slurry containing fluoroapatite was spray-dried at 150° C. using a spray drier (manufactured by OHKAWARA KAKOHKI Co., Ltd. under the trade name of "OC-20") to thereby granulate fluoroapatite. In this way, particulate dried particles were produced. Thereafter, a part of the thus obtained dried particles (fluoroapatite powder) was classified to obtain particles having a median particle size of about 40 μm.

Example 2

First, 3.11 kg of calcium hydroxide was prepared as a calcium source. Then, this calcium hydroxide was suspended in 9 kg of pure water to thereby prepare 10 wt % calcium hydroxide suspension.

Next, 4 kg of an aqueous hydrogen fluoride solution having a concentration of 4.2 wt % and 2.9 kg of an aqueous phosphoric acid solution having a concentration of 85 wt % were prepared, respectively. Then, the aqueous hydrogen fluoride solution and the aqueous phosphoric acid solution were mixed with 15 L of pure water to thereby prepare a mixture of phosphoric acid and hydrogen fluoride.

Next, the mixture of phosphoric acid and hydrogen fluoride was dropped into the calcium hydroxide suspension at a rate of 2 L/hr in a state that the calcium hydroxide suspension was stirred at a stirring power of 30 W to obtain a slurry.

It is to be noted that a pH of the calcium hydroxide suspension, in which the mixture of phosphoric acid and hydrogen fluoride was dropped, at the time of completion of the dropping of the mixture of phosphoric acid and hydrogen fluoride was 3.4.

Further, the calcium hydroxide suspension in which the mixture of phosphoric acid and hydrogen fluoride was dropped was stirred at a stirring power of 30 W at 25° C. for 24 hours to react the calcium hydroxide, hydrogen fluoride and phosphoric acid in the calcium hydroxide suspension. As a result, a slurry containing fluoroapatite was obtained.

Next, 20 L of the thus obtained slurry containing fluoroapatite was put in a tank. Then, the tank was put in an ultrasonic tank provided with an ultrasonic washing machine (manufactured by SND CO., Ltd. under the trade name of "US-180MD"; a maximum power is 1900 W; a volume of the ultrasonic tank is 180 L). In such a state, the ultrasonic wave was applied to the slurry containing fluoroapatite under the conditions that the power was 1900 W and a time of applying the ultrasonic wave to the slurry was 3 hours.

In this regard, it is to be noted that 500 mL of the slurry was taken every 1 hour during applying the ultrasonic wave to the slurry containing fluoroapatite.

It is to be noted that a reaction product contained in the slurry was found to be fluoroapatite by powder X-ray diffractometry. Further, as a result of powder X-ray diffracting fluoroapatite, a ratio of substitution of the hydroxyl groups of hydroxyapatite by the fluorine atoms was about 92%.

Further, as a result of powder x-ray diffraction of fluoroapatite dried particles described later, any products other than fluoroapatite were not detected.

Then, the slurry containing fluoroapatite was spray-dried at 150° C. using a spray drier (manufactured by OHKAWARA KAKOHKI Co., Ltd. under the trade name of "OC-20") to thereby granulate fluoroapatite. In this way, particulate dried particles were produced. Thereafter, a part of the thus obtained dried particles (fluoroapatite powder) was classified to obtain particles having a median particle size of about 40 μm.

Comparative Example 1

Dried particles (fluoroapatite powder) having a median particle size of about 40 μm were produced in the same manner as in the Example 1 except that an ultrasonic wave was not applied to a slurry containing fluoroapatite.

Comparative Example 2

Dried particles (fluoroapatite powder) having a median particle size of about 40 μm were produced in the same manner as in the Example 2 except that an ultrasonic wave was not applied to a slurry containing fluoroapatite.

Reference Example 1

First, calcium hydroxide (calcium source) was suspended in pure water to obtain a calcium hydroxide suspension, and then an aqueous phosphoric acid solution (phosphate source) was dropped into the calcium hydroxide suspension while the calcium hydroxide suspension was sufficiently stirred. As a result, 50 L of a slurry containing 10 wt % of hydroxyapatite was obtained.

Next, 20 L of the thus obtained slurry containing hydroxyapatite was put in a tank. Then, the tank was put in an ultrasonic tank provided with an ultrasonic washing machine (manufactured by SND CO., Ltd. under the trade name of "US-180MD"; a maximum power is 1900 W; a volume of the ultrasonic tank is 180 L). In such a state, the ultrasonic wave was applied to the slurry containing hydroxyapatite under the conditions that the power was 1900 W and a time of applying the ultrasonic wave to the slurry was 3 hours.

In this regard, it is to be noted that 500 mL of the slurry was taken every 1 hour during applying the ultrasonic wave to the slurry containing hydroxyapatite.

It is to be noted that a reaction product contained in the slurry was found to be hydroxyapatite by powder X-ray diffractometry.

Then, the slurry containing hydroxyapatite was spray-dried at 150° C. using a spray drier (manufactured by OHKAWARA KAKOHKI Co., Ltd. under the trade name of "OC-20") to thereby granulate hydroxyapatite. In this way, particulate dried particles were produced. Thereafter, a part of the thus obtained dried particles (hydroxyapatite powder) was classified to obtain particles having a median particle size of about 40 μm.

Reference Example 2

Dried particles (hydroxyapatite powder) having a median particle size of about 40 μm were produced in the same manner as in the Reference Example 1 except that an ultrasonic wave was not applied to a slurry containing hydroxyapatite.

2. Evaluation 2-1 Evaluation of Grain Size Distribution of Appetite Aggregates

In the Examples 1 and 2, the part of the slurry was taken every 1 hour during applying the ultrasonic wave to the slurry containing fluoroapatite. The parts of the slurry taken after 1 hour, 2 hours, and 3 hours from the time the ultrasonic wave was first applied to the slurry were used for this evaluation. The taken parts of the slurry were subjected to an apparatus of measuring grain size distributions (manufactured by Microtrac Inc. under the trade name of "FRA") to obtain a grain size distribution of aggregates of fluoroapatite contained in the slurry. Such a grain size distribution of the aggregates is measured in the volume basis to obtain a cumulative distribution curve of the grain size distribution of the aggregates. Therefore, 50% grain size of the aggregate was obtained by using the cumulative distribution curve. In this regard, it is to be noted that 50% grain size of the aggregate of hydroxyapatite contained in the slurry obtained in the Reference Example 1 was also obtained by the same process as described above.

In this regard, it is to be noted that the 50% grain size of the aggregate of fluoroapatite means a grain size of the aggregate of fluoroapatite which is obtained as follows. When the cumulative distribution curve of the grain size distribution of the aggregates of fluoroapatite contained in the slurry is plotted using a graph in which the ordinate axis represents a relative amount of the aggregates (%) with respect to the total amount of all aggregates (fluoroapatite) (100%) and the abscissa axis represents a grain size of aggregates (μm), the 50% grain size represents a grain size of an aggregate at a point of 50% of the relative amount of the aggregates in the cumulative distribution curve. In this regard, it is to be noted that 50% grain size of the aggregate of hydroxyapatite also means the same as meaning described above. These results are shown in Table 1.

TABLE 1

| Kind of primary particles | | 50% Grain size [μm] | |
|---|---|---|---|
| | | After 1 hour | After 2 hours | After 3 hours |
| Ex. 1 | Fluoroapatite | 4.385 | 4.178 | 4.160 |
| Ex. 2 | Fluoroapatite | 10.67 | 10.21 | 9.850 |
| Ref. Ex. 1 | Hydroxyapatite | 6.561 | 6.848 | 6.363 |

The aggregates of the fluoroapatite primary particles were formed in the slurry by Van der Waals' forces which generate among the fluoroapatite primary particles. The aggregates of the hydroxyapatite primary particles were also formed in the slurry by Van der Waals' forces which generate among the hydroxyapatite primary particles. Generally, in both aggregates, it is known that a first aggregate and a second aggregate are formed in the slurry when the grain size distribution of the aggregates is measured in the volume basis to obtain a frequency distribution curve of the grain size distribution of the aggregates. An amount (ratio) of the first aggregate is larger than that of the second aggregate as shown in FIG. 1.

Therefore, the ultrasonic wave was applied to the slurry containing fluoroapatite (or hydroxyapatite) in which the aggregates including the first and second aggregates were formed. Then, change of the aggregates which may occur by applying the ultrasonic wave to the slurry was observed. As a result, in fluoroapatite obtained in each of the Examples 1 and 2 and hydroxyapatite obtained in the Reference Example 1, a tendency that the 50% grain sizes of fluoroapatite and hydroxyapatite were slightly lowered with the lapse of time was seen as shown in Table 1. However, problems hardly occurred to the 50% grain sizes of fluoroapatite and hydroxyapatite due to the tendency. Therefore, even if the ultrasonic wave was applied to the slurry containing fluoroapatite (or hydroxyapatite), it was found that the second aggregates of both fluoroapatite and hydroxyapatite were not broken and changed to the first aggregates thereof.

2-2. Evaluation of Appetite Powder Strength

Each of the dried particles (that is, fluoroapatite powder) obtained in the Examples 1 and 2 and the comparative Examples 1 and 2, and each of the dried particles (that is, hydroxyapatite powder) obtained in the Reference Examples 1 and 2 was subjected to a compression testing machine (manufactured by Shimadzu Corporation under the trade name of "MCT-W200-J") to obtain particle strength thereof.

TABLE 2

| | Kind of primary particles | Producing method | Ultrasonic wave applying | Particle strength [MPa] |
|---|---|---|---|---|
| Ex. 1 | Fluoroapatite | First method | Yes | 6.5 |
| Comp. Ex. 1 | Fluoroapatite | First method | No | 5.3 |
| Ex. 2 | Fluoroapatite | Second method | Yes | 5.9 |
| Comp. Ex. 2 | Fluoroapatite | Second method | No | 4.9 |
| Ref. Ex. 1 | Hydroxyapatite | — | Yes | 1.9 |
| Ref. Ex. 2 | Hydroxyapatite | — | No | 1.8 |

As shown in Table 2, the particle strength of the dried particles obtained in each of the Examples 1 and 2, which were obtained by using the slurry containing fluoroapatite to which the ultrasonic wave was applied, was larger than that of the dried particles obtained in each of the Comparative Examples 1 and 2, which were obtained by using the slurry containing fluoroapatite to which no ultrasonic wave was applied. These results did not depend on the method of producing fluoroapatite.

In contrast, the particle strength of the dried particles obtained in the Reference Example 1, which were obtained by using the slurry containing hydroxyapatite to which the ultrasonic wave was applied, was substantially the same as that of the dried particles obtained in the Reference Example 2, which were obtained by using the slurry containing hydroxyapatie to which no ultrasonic wave was applied. Further, the particle strength of the dried particles obtained in the Reference Example 1 was not larger than that of the dried particles obtained in the Reference Example 2.

In view of the above, after the ultrasonic wave was applied to the slurry containing fluoroapatite, the fluoroapatite powder (dried particles) mainly constituted of fluoroapatite was produced by using the slurry. By doing so, it was found that it was possible to produce fluoroapatite powder having the improved particle strength. This phenomenon was specifically observed in the only fluoroapatite powder.

As described the above, in the Examples 1 and 2, the ultrasonic wave was applied to the slurry containing fluoroapatite after the production of fluoroapatite. Alternatively, the ultrasonic wave was applied to the slurry containing fluoroapatite during the production of fluoroapatite. Dried particles obtained in such a case were also evaluated like the dried particles obtained in the Examples 1 and 2. There was shown a tendency that the results were the same as those of the Examples 1 and 2.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

Further, it is also to be understood that the present disclosure relates to subject matter contained in Japanese Patent Application No. 2008-254836 (filed on Sep. 30, 2008) which is expressly incorporated herein by reference in its entireties.

What is claimed is:

1. A method of producing fluoroapatite powder from raw materials consisting of a calcium compound, a phosphate compound, a fluorine compound, and water, the method comprising:
  preparing a slurry containing fluoroapatite primary particles mainly constituted of fluoroapatite from the raw materials at a pH of 2.5 to 4.5;
  applying an ultrasonic wave to the slurry; and
  drying the slurry to which the ultrasonic wave is applied to granulate the fluoroapatite primary particles contained in the slurry to obtain the fluoroapatite powder mainly constituted of the fluoroapatite,
  wherein applying the ultrasonic wave to the slurry is carried out by using an ultrasonic washing machine having an ultrasonic tank containing water, wherein the slurry is put in a container and then the container containing the slurry is put in the ultrasonic tank, and wherein in such a state, when a total amount of the slurry and the water is 180 L, a power of the ultrasonic wave to be applied to the slurry is in the range of 500 to 2500 W, and
  wherein the fluoroapatite powder has a compressive particle strength of 5.4 MPa or more, and the compressive particle strength is measured for fluoroapatite powder particles having an average particle size is 40±5 μm.

2. The method as claimed in claim 1, wherein the step of applying the ultrasonic wave to the slurry is carried out after the fluoroapatite is produced.

3. The method as claimed in claim 1, wherein a time of applying the ultrasonic wave to the slurry is in the range of 10 minutes to 10 hours.

4. The method as claimed in claim 1, wherein an amount of the fluoroapatite primary particles contained in the slurry is 20 wt % or less.

5. The method as claimed in claim 1, wherein the calcium compound is calcium hydroxide.

6. The method as claimed in claim 1, wherein the phosphate compound is phosphoric acid.

7. The method as claimed in claim 1, wherein the fluorine compound is hydrogen fluoride.

8. The method as claimed in claim 1, wherein the slurry containing the fluoroapatite primary particles is obtained by reacting the calcium compound and the phosphate compound in water to obtain a slurry containing hydroxyapatite having hydroxyl groups and the water, and then reacting the hydroxyapatite and the fluorine compound having fluorine atoms in the hydroxyapatite slurry so that at least a part of the hydroxyl groups of the hydroxyapatite is substituted by the fluorine atoms of the fluorine compound to thereby obtain the fluoroapatite primary particles.

9. The method as claimed in claim 1, wherein the slurry containing the fluoroapatite primary particles is obtained by preparing a first mixture consisting of the calcium compound and water, and a second mixture consisting of the phosphate compound and the fluorine compound having fluorine atoms and water, dropping the second mixture into the first mixture so that hydroxyapatite having hydroxyl groups is prepared, and then at least a part of the hydroxyl groups of the hydroxyapatite is substituted by the fluorine atoms of the fluorine compound to thereby obtain the fluoroapatite primary particles.

10. The method as claimed in claim 1, wherein the pH of the slurry during its preparation is 2.5 to 3.4.

11. The method as claimed in claim 1, wherein the pH of the slurry during its preparation is 2.5 to 3.00.

12. The method of claim 1, wherein the fluoroapatite is adapted to be formed by substituting hydroxyl groups of hydroxyapatite present on a surface and an inside thereof by fluorine atoms of the fluorine compound, and wherein a rate of substitution of the hydroxyl groups by the fluorine atoms is 75% or more.

13. A method of producing fluoroapatite powder from raw materials consisting of a calcium compound, a phosphate compound, a fluorine compound, and water, the method comprising:

preparing a slurry containing fluoroapatite primary particles mainly constituted of fluoroapatite from the raw materials at a pH of 2.5 to 4.5;

applying an ultrasonic wave to the fluoroapatite primary particles in the slurry without collecting the fluoroapatite primary particles from the slurry; and drying the slurry to which the ultrasonic wave is applied to granulate the fluoroapatite primary particles contained in the slurry to obtain the fluoroapatite powder mainly constituted of the fluoroapatite, wherein applying the ultrasonic wave to the slurry is carried out by using an ultrasonic washing machine having an ultrasonic tank containing water, wherein the slurry is put in a container and then the container containing the slurry is put in the ultrasonic tank, and wherein in such a state, when a total amount of the slurry and the water is 180 L, a power of the ultrasonic wave to be applied to the slurry is in the range of 500 to 2500 W, and wherein the fluoroapatite powder has a compressive particle strength of 5.4 MPa or more, and the compressive particle strength is measured for fluoroapatite powder particles having an average particle size is 40±5 μm.

14. The method as claimed in claim 13, wherein the pH of the slurry during its preparation is 2.5 to 3.4.

15. The method as claimed in claim 13, wherein the pH of the slurry during its preparation is 2.5 to 3.00.

* * * * *